United States Patent
Karabinis

(10) Patent No.: US 7,653,348 B2
(45) Date of Patent: Jan. 26, 2010

(54) SATELLITE COMMUNICATIONS SYSTEMS, COMPONENTS AND METHODS FOR OPERATING SHARED SATELLITE GATEWAYS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 639 days.

(21) Appl. No.: 11/280,621

(22) Filed: Nov. 16, 2005

(65) Prior Publication Data

US 2006/0105707 A1    May 18, 2006

Related U.S. Application Data

(60) Provisional application No. 60/628,149, filed on Nov. 16, 2004.

(51) Int. Cl.
```
H04B 7/185    (2006.01)
H04W 4/00     (2009.01)
G01S 13/00    (2006.01)
H04B 7/14     (2006.01)
H04J 1/10     (2006.01)
H04J 3/08     (2006.01)
H04B 7/204    (2006.01)
H04B 3/36     (2006.01)
H04B 7/17     (2006.01)
H04B 17/02    (2006.01)
H04L 25/20    (2006.01)
H04L 25/52    (2006.01)
H04B 7/02     (2006.01)
H04L 1/02     (2006.01)
```
(52) U.S. Cl. .............. 455/12.1; 455/13.1; 455/427; 455/430; 342/155; 370/315; 370/316; 370/325; 375/211; 375/267

(58) Field of Classification Search .............. 455/3.02, 455/3.03, 3.04, 3.05, 427, 12.1, 13.1–13.3, 455/550, 552.1, 553, 554.1, 118, 178.1, 179.1, 455/180.1, 187.1, 188, 191.1, 197.3, 311, 455/323, 102, 127.1, 422.1, 451, 456.2, 552, 455/553.1, 561, 575.7, 67.11, 69, 73, 78, 455/93, 428, 429, 430, 431, 450, 104, 168.1, 455/452.1, 454; 370/315, 16, 278, 316, 317, 370/320, 325, 334, 338, 401; 343/702; 342/375.16, 342/155, 26 A; 375/211, 267
See application file for complete search history.

(56) References Cited

U.S. PATENT DOCUMENTS 4,748,622 A    5/1988    Muratani et al.
(Continued)

FOREIGN PATENT DOCUMENTS

EP    0 489 661 A1    6/1992
(Continued)

OTHER PUBLICATIONS

Invitation to Pay Additional Fees and Partial International Search Report for International Patent Application No. PCT/US2005/041559 mailed on Apr. 25, 2006.
(Continued)

Primary Examiner—Nay A Maung
Assistant Examiner—Paul P Tran
(74) Attorney, Agent, or Firm—Myers Bigel Sibley & Sajovec, P.A.

(57) ABSTRACT

A shared satellite gateway can be configured to process at least first and second communications signals associated with respective at least first and second space-based components. The at least first and second communications signals are provided to/from the shared satellite gateway by respective at least first and second service links and respective at least first and second feeder links of the respective at least first and second space-based components.

31 Claims, 4 Drawing Sheets

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,758,261 A * | 5/1998 | Wiedeman | 455/13.1 |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,918,157 A | 6/1999 | Wiedeman et al. | 455/13.1 |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,058,115 A | 5/2000 | Sawyer et al. | 370/401 |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | 455/435 |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,317,420 B1 | 11/2001 | Schiff | 370/325 |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,654,357 B1 * | 11/2003 | Wiedeman | 370/315 |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,423,987 B2 * | 9/2008 | Anderson et al. | 370/316 |
| 2002/0039900 A1 * | 4/2002 | Wiedeman et al. | 455/428 |
| 2002/0098802 A1 | 7/2002 | Karabinis | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2004/0066347 A1 | 4/2004 | Schiff | 343/776 |
| 2004/0072539 A1 | 4/2004 | Monte et al. | |
| 2004/0097192 A1 | 5/2004 | Schiff | 455/12.1 |
| 2004/0102156 A1 | 5/2004 | Loner | |
| 2004/0121727 A1 | 6/2004 | Karabinis | |
| 2004/0121728 A1 * | 6/2004 | Gibson et al. | 455/12.1 |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Karabinis et al. | |
| 2005/0090256 A1 | 4/2005 | Dutta | |
| 2005/0118947 A1 * | 6/2005 | Ames et al. | 455/12.1 |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |

FOREIGN PATENT DOCUMENTS

| | | |
|---|---|---|
| EP | 0 506 255 A2 | 9/1992 |
| EP | 0 536 033 A2 | 4/1993 |
| EP | 0 597 225 A1 | 5/1994 |
| EP | 0 506 255 B1 | 11/1996 |
| EP | 0 748 063 A2 | 12/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |

| | | |
|---|---|---|
| EP | 0 831 599 A2 | 3/1998 |
| EP | 0 831 599 A3 | 3/1998 |
| EP | 0 872 966 A2 | 10/1998 |
| EP | 1 059 826 A1 | 12/2000 |
| EP | 1 193 989 A1 | 4/2002 |
| GB | 2 321 372 | 7/1998 |
| GB | 2 321 372 A | 7/1998 |
| WO | WO 90/13186 | 11/1990 |
| WO | WO 90/13186 A1 | 11/1990 |
| WO | WO 01/54314 A1 | 7/2001 |
| WO | WO 01/93458 A2 | 12/2001 |
| WO | WO 02/09318 A2 | 1/2002 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Jung et al. "Inter-Satellite Links for Personal Communications Low Earth Orbit Satellite Systems" *European Conference on Satellite Communications*, Manchester (1993).

Mizuni et al. "Double-Hop Networks Using VSATS for the INTELSAT System" *Communications Technology for the 1990's and Beyond*, Dallas 3 (1989) *Institute of electrical and Electronics Engineers*.

International Search-Report and Written Opinion for PCT/US2005/041559; date of mailing Sep. 28, 2006.

\* cited by examiner

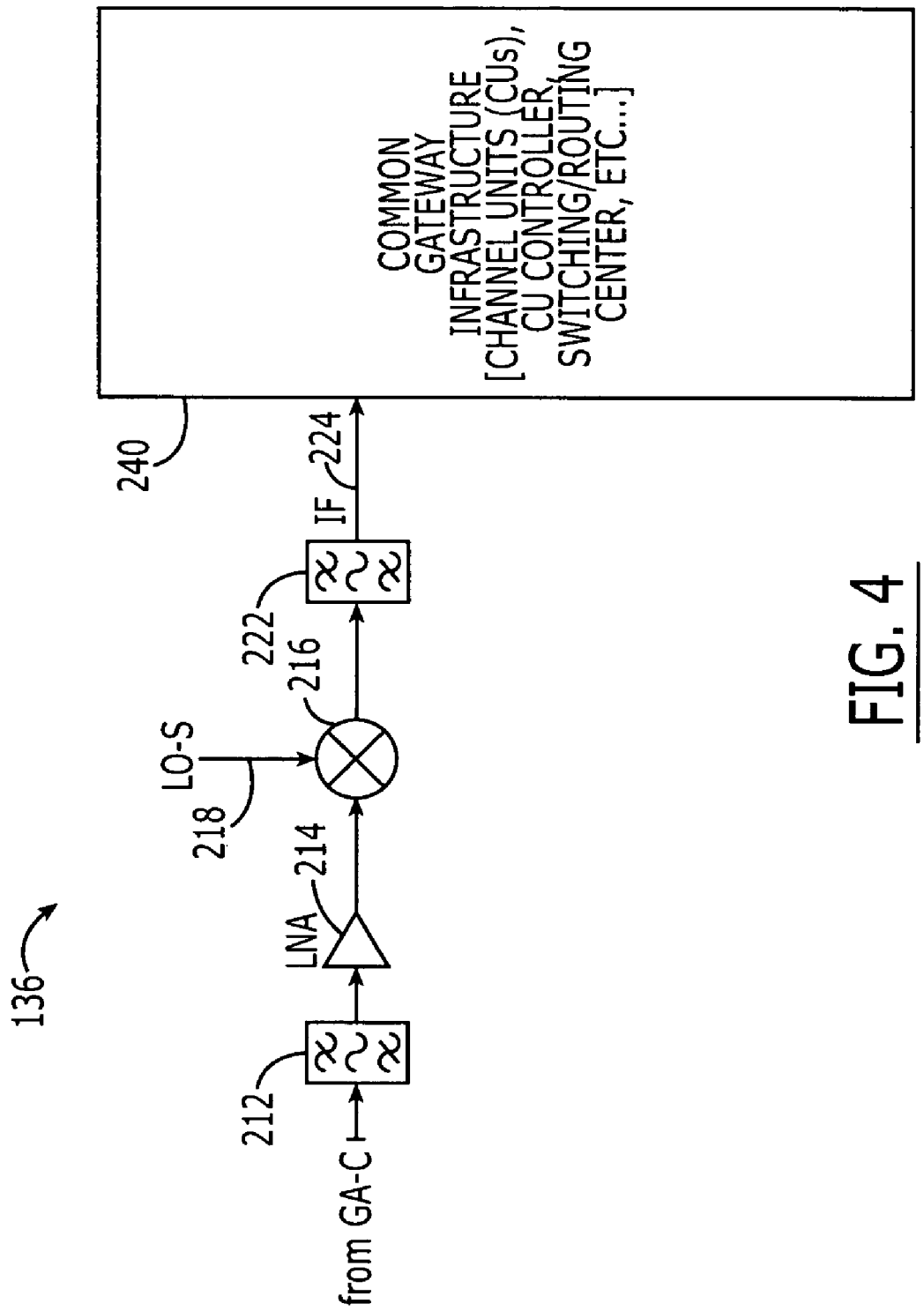

SATELLITE COMMUNICATIONS SYSTEMS, COMPONENTS AND METHODS FOR OPERATING SHARED SATELLITE GATEWAYS

CLAIM FOR PRIORITY

This application claims priority to U.S. Provisional Patent Application No. 60/628,149, filed Nov. 16, 2004, entitled Satellite Communications Systems and Methods Having Shared Ground Infrastructure, the entire content of which is incorporated herein by reference.

FIELD OF THE INVENTION

This invention relates to wireless communications systems and methods, and more particularly to satellite communications systems, methods, and computer program products.

BACKGROUND

Satellite communications systems and methods are widely used for radioterminal communications. Satellite radioterminal communications systems and methods generally employ at least one space-based component, such as one or more satellites, that is/are configured to wirelessly communicate with a plurality of satellite radioterminals.

A satellite radioterminal communications system or method may utilize a single antenna pattern (or beam) covering an entire area served by the system. Alternatively or in combination with the above, in cellular satellite radioterminal communications systems and methods, multiple antenna patterns (beams or cells) may be provided, each of which may be configured to serve a substantially distinct geographical area in an overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communications signals being communicated from the satellite to a radioterminal over a downlink or forward link, and from the radioterminal to the satellite over an uplink or return link. The downlink and uplink may be collectively referred to as service links.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal", "wireless terminal" or "wireless user device".

Cellular satellite communications systems and methods may deploy hundreds of cells, each of which corresponds to one or more space-based component antenna patterns (spot beams), collectively spanning a space-based component footprint corresponding to a service area. It will be understood that a large number of cells may be generally desirable, since the frequency reuse and the capacity of a cellular satellite communications system or method may both increase in direct proportion to the number of cells. Moreover, for a given space-based component footprint or service area, increasing the number of cells may also provide a higher gain per cell, which can increase the link robustness and improve the quality of service.

The uplink and downlink communications between the wireless terminals and the satellite may utilize one or more air interfaces, including proprietary air interfaces and/or conventional terrestrial cellular interfaces (and/or modifications thereof), such as Time Division Multiple Access (TDMA), Orthogonal Frequency Division Multiple Access (OFDMA) and/or Code Division Multiple Access (CDMA) air interfaces. A single air interface may be used throughout the cellular satellite system. Alternatively, multiple air interfaces may be used for the satellite communications. See, for example, U.S. Pat. No. 6,052,560, issued Apr. 18, 2000, entitled Satellite System Utilizing a Plurality of Air Interface Standards and Method Employing the Same, by the present inventor Karabinis. In general, regardless of the air interface or interfaces that are used, each satellite cell (i.e., each space-based component cell) generally uses at least one carrier frequency to provide service. Thus, one or more return service links and/or one or more forward service links may use one or more carrier frequencies to provide service.

The above description has focused on communications between the space-based component (one or more satellites) and the wireless terminals. However, cellular satellite communications systems and methods also generally employ a bidirectional feeder link for communications between a terrestrial satellite gateway and the space-based component. The bidirectional feeder link includes a forward feeder link from the gateway to the space-based component and a return feeder link from the space-based component to the gateway. The forward feeder link and/or the return feeder link each may use one or more feeder link carrier frequencies.

Terrestrial networks can enhance cellular satellite radioterminal system availability, efficiency and/or economic viability by terrestrially using and/or reusing at least some of the frequencies that are allocated to cellular satellite radioterminal systems. In particular, it is known that it may be difficult for cellular satellite radioterminal systems to reliably serve densely populated areas, because the space-based component signal may be blocked by high-rise structures and/or may not penetrate into buildings. As a result, the satellite spectrum may be underutilized or unutilized in such areas. The terrestrial use and/or reuse of at least some of the satellite system frequencies can reduce or eliminate this potential problem.

Moreover, the capacity of a hybrid system, comprising terrestrial and satellite-based connectivity and configured to terrestrially use and/or reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to use and/or reuse terrestrially at least some of the frequencies of the space-based component may become more economically viable, as it may be able to serve more effectively and reliably a larger subscriber base.

U.S. Pat. No. 6,684,057, to inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial use of satellite frequencies are described in U.S. Pat. Nos. 6,684,057 to Karabinis, entitled Systems and Methods for Terrestrial Reuse of Cellular Satellite Frequency Spectrum; 6,785,543 to Karabinis, entitled Filters for Combined Radiotelephone/GPS Terminals; 6,856,787 to Karabinis, entitled Wireless Communications Systems and Methods Using Satellite-Linked Remote Terminal Interface Subsystems; 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

SUMMARY

Embodiments according to the present invention can be provided by satellite communications systems, components and methods for operating shared satellite gateways. Pursuant to these embodiments, a satellite communications system can include a gateway configured to process at least first and second communications signals associated with respective at least first and second service links and respective at least first and second feeder links of respective at least first and second space-based components. In some embodiments according to the invention, the respective at least first and second service links are in different frequency bands. In some embodiments according to the invention, the respective at least first and second service links are in a common frequency band.

In some embodiments according to the invention, the system further includes respective at least first and second gateway antennas coupled to the gateway, wherein each of the respective at least first and second gateway antennas is configured to communicate with at least one of the respective at least first and second space-based components. In some embodiments according to the invention, the respective at least first and second gateway antennas are configured to communicate with the respective at least first and second space-based components via the respective at least first and second feeder links in respective at least first and second frequency bands. In some embodiments according to the invention, the respective at least first and second gateway antennas are configured to communicate with the respective at least first and second space-based components via the respective at least first and second feeder links using a substantially common frequency band.

In some embodiments according to the invention, the respective at least first and second service links are configured to provide service to wireless terminals via respective air-interfaces that are substantially the same. In some embodiments according to the invention, the system further includes a single gateway antenna coupled to the gateway, wherein the single gateway antenna is configured to communicate with the respective at least first and second space-based components. In some embodiments according to the invention, the single gateway antenna is configured to communicate with the respective at least first and second space-based components over separate feeder links in a common satellite frequency band. In some embodiments according to the invention, the single gateway antenna is configured to communicate with the respective at least first and second space-based components over separate feeder links in different satellite frequency bands.

In some embodiments according to the invention, the gateway further includes a first filter coupled to the single gateway antenna. A low-noise amplifier is coupled to an output of the first filter. A mixer is coupled to an output of the low-noise amplifier and a second filter is coupled to an output of the mixer. In some embodiments according to the invention, the respective at least first and second space-based components are substantially co-located.

In some embodiments according to the invention, the respective at least first and second service links are configured to provide service via respective different air-interfaces to wireless terminals. In some embodiments according to the invention, at least one element of the gateway is shared by the respective at least first and second space-based components to provide a processing of the at least first and second communications signals associated with the respective at least first and second space-based components.

In some embodiments according to the invention, the gateway further includes at least two circuits, respectively including a first filter coupled to a gateway antenna. A low-noise amplifier is coupled to an output of the first filter. A mixer is coupled to an output of the low-noise amplifier and a second filter is coupled to an output of the mixer. In some embodiments according to the invention, the system further includes a gateway element responsive to at least one output of the second filters of the at least two circuits.

In some embodiments according to the invention, a satellite communications system includes a first space-based component that is configured to communicate with a plurality of first wireless terminals over a first service link(s) in a first satellite frequency band. A second space-based component is configured to communicate with a plurality of second wireless terminals over a second service link(s) in a second satellite frequency band and a satellite gateway is configured to communicate with the first space-based component over a first feeder link(s) and to communicate with the second space-based component over a second feeder link(s) and wherein the communications with the first and second space-based component are provided by the satellite gateway using at least one common signal processing element that is used by the satellite gateway to communicate with the first space-based component and to communicate with the second space-based component.

In some embodiments according to the invention, the satellite gateway includes a first gateway antenna that is configured to communicate with the first space-based component over the first feeder link(s). A second gateway antenna is configured to communicate with the second space-based component over the second feeder link(s) and a common gateway electronics system is responsive to the first gateway antenna and to the second gateway antenna.

In some embodiments according to the invention, the first satellite frequency band is substantially the same as the second satellite frequency band. In some embodiments according to the invention, the first feeder link(s) and the second feeder link(s) use substantially the same feeder link frequency band. In some embodiments according to the invention, a feeder link frequency band used by the first feeder link(s) is different than a feeder link frequency band used by the second feeder link(s). In some embodiments according to the invention, the first service link(s) and the second service link(s) use substantially the same air interface. In some embodiments according to the invention, the first service link(s) and the second service link(s) use different air interfaces.

In some embodiments according to the invention, the first and second space-based components are configured to communicate with the respective pluralities of first and second wireless terminals over the respective first and second service links in the respective first and second satellite frequency bands using substantially the same air interface. In some embodiments according to the invention, the first feeder link(s) and the second feeder link(s) are in a common frequency band. In some embodiments according to the invention, the first and second space-based components are substantially co-located.

In some embodiments according to the invention, the satellite gateway includes a common gateway antenna that is configured to communicate with the first space-based component and the second space-based component over the first and second feeder links in the common frequency band and a common gateway electronics system that is responsive to the common gateway antenna.

In some embodiments according to the invention, a satellite communications component includes a satellite gateway configured to provide communications with a first space-based component over a first feeder link and to provide communications with a second space-based component over a second feeder link; wherein the satellite gateway provides communications with the first and second space-based component using at least one element that is common to the provision of communications with the first and second space-based component.

In some embodiments according to the invention, the component further includes a single satellite gateway antenna coupled to the satellite gateway, wherein the single satellite gateway antenna is configured to communicate with the first and second space-based components. In some embodiments according to the invention, the single satellite gateway antenna is configured to communicate with the first and second space-based components over the first and second feeder links in a common satellite frequency band.

In some embodiments according to the invention, the single satellite gateway antenna is configured to communicate with the first and second space-based components over the first and second feeder links in different satellite frequency bands. In some embodiments according to the invention, the satellite gateway further includes a feeder link processing circuit including a first filter coupled to the single satellite gateway antenna. A low-noise amplifier is coupled to an output of the first filter. A mixer is coupled to an output of the low-noise amplifier and a second filter is coupled to an output of the mixer.

In some embodiments according to the invention, a method of providing satellite communications includes processing at a satellite gateway at least first and second communications signals associated with respective at least first and second space-based components, wherein the at least first and second communications signals are provided to the satellite gateway by respective at least first and second feeder links and respective at least first and second service links of the respective at least first and second space-based components.

In some embodiments according to the invention, the respective at least first and second feeder links are in different satellite frequency bands. In some embodiments according to the invention, the respective at least first and second feeder links are in a common satellite frequency band. In some embodiments according to the invention, the satellite communications are provided by the respective at least first and second space-based components via respective at least first and second air-interfaces that are different.

In some embodiments according to the invention, processing includes relaying information to/from a first space-based component and to/from a second space-based component via the satellite gateway. In some embodiments according to the invention, relaying information includes relaying internet communications, video information, and/or audio information, via the satellite gateway.

In some embodiments according to the invention, a satellite communications system includes a shared satellite gateway configured to relay communications from a first subscriber of a first satellite communications service to a second subscriber of a second satellite communications service via respective separate feeder links provided to two separate space-based components by the shared satellite gateway.

In some embodiments according to the invention, a method of providing communications includes transmitting communications from a first satellite radiotelephone to a first space-based component. The communications are relayed from the first space-based component directly to a shared satellite gateway. The communications are relayed from the shared satellite gateway directly to a second space-based component and the communications are relayed from the second space-based component to a second satellite radiotelephone.

BRIEF DESCRIPTION OF THE DRAWINGS

FIG. 4 is a block diagram of common gateway electronic systems and methods according to various embodiments of the present invention.

DESCRIPTION OF EMBODIMENTS ACCORDING TO THE INVENTION

Figure 1:
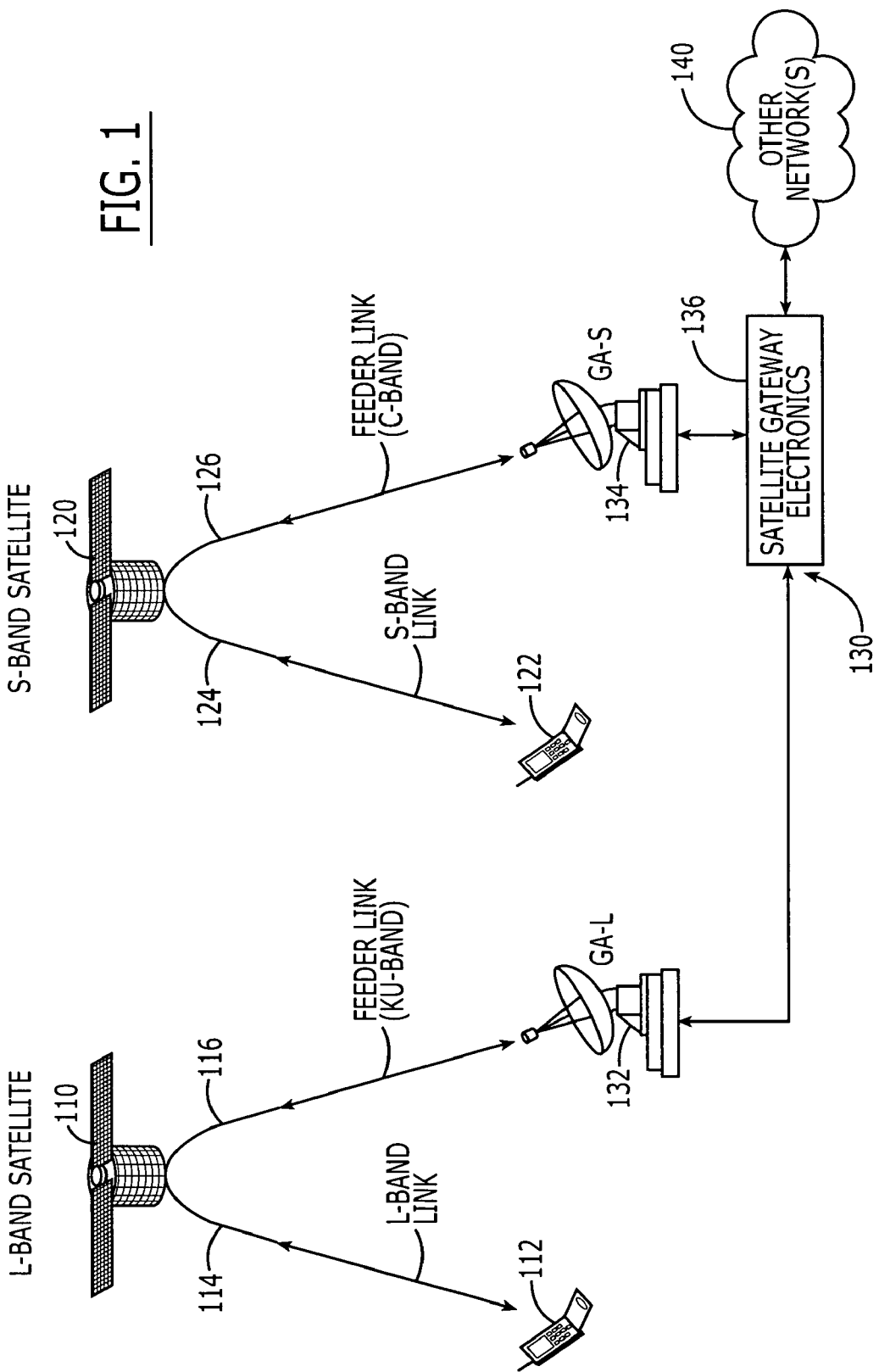
FIG. 1 schematically illustrates satellite systems and methods with shared ground infrastructure according to various embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

Moreover, as used herein, the term "substantially the same", as applied, for example, to frequency bands, means that two or more frequency bands being compared substantially overlap, but that there may be some areas of non-overlap, for example, at the band ends. Moreover, the term "substantially the same", as applied to air interfaces, means that two or more air interfaces being compared are similar but need not be identical. Some changes may be made to one air interface relative to another to account for different characteristics that may exist between, for example, a satellite system and a terrestrial system, between two different satellite systems and/or for other reasons. For example, a different vocoder rate may be used for satellite communications compared to the vocoder rate that is used for terrestrial communications. Different forward error correction coding, different interleaving depth, and/or different spread-spectrum codes may also be used in a satellite system relative to respective values/parameters used in a terrestrial system or another satellite system.

As used herein, the term "shared" or "common" as applied to an element, such as a ground-based system element (i.e., an element/component of a satellite gateway), that is used by two or more satellite systems and/or space-based components to communicate with radioterminals denotes an element that is substantially used by the two or more satellite systems and/or space-based components to perform substantially the same function for the two satellite systems and/or space-based components. The "shared" or "common" element can be substantially located at a facility, building, room, rack, and/or within the same electronic packages (i.e., chips). A "shared" or "common" element may, for example, be a sub-system that performs circuit-based and/or packet-based switching, radio resource management, modulation/demodulation, frequency translation, compression and/or de-compression of voice and/or data, reception/transmission of electro-magnetic energy, etc.

Embodiments of the present invention provide satellite systems, methods and components with shared ground infrastructure. The shared ground infrastructure can allow integration and cost saving/sharing of two (or more) satellite systems that use different service link bands and/or different satellites. The amount of integration may depend on the commonality of the air interfaces, feeder links, and the collocation of the satellites, as will be described in detail below.

The integration of the two (or more) satellite systems can be provided so that transmissions (such as Internet data transmission, video and/or audio data, and other types of data) to/from the separate satellite systems and/or separate space-based components (that may be associated with one overall system and/or one overall system operator) can be relayed and/or processed by a single satellite gateway shared by the systems and/or space-based components. In some embodiments according to the invention, the integration may allow the single satellite gateway to provide transmission of information for the two satellite systems and/or space-based components and provide, for example, satellite telephone services and other services (such as packet data services) for subscribers serviced by the different satellite systems and/or space-based components.

FIG. 1 schematically illustrates satellite communications systems and methods according to various embodiments of the present invention. As shown in FIG. 1, a first space-based component, such as an L-band satellite 110, is configured to communicate with a plurality of first wireless terminals 112 over first service links 114 in a first satellite frequency band, such as L-band. A second space-based component, such as an S-band satellite 120, is configured to communicate with a plurality of second wireless terminals 122 over second service links 124 in a second satellite frequency band, such as S-band. The footprints of the two satellites 110 and 120 may be disjoint or may at least partially overlap. A satellite gateway 130 is configured to communicate with the first space-based component 110 over a first feeder link 116, and to communicate with the second space-based component 120 over a second feeder link 126. In embodiments of FIG. 1, the first and second feeder links 116 and 126 may be in different bands, or in substantially the same band. For example, the first feeder link 116 is illustrated as being in ku-band, and the second feeder 126 is illustrated as being in C-band. However, any other satellite or non-satellite, common or distinct, frequency bands may be used for the feeder links 116 and 126. Moreover, the satellites 110 and 120 may be operative in service link bands other than the illustrative L-band and/or S-band.

Still referring to FIG. 1, the satellite gateway 130 includes a first gateway antenna 132, labeled GA-L, that is configured to communicate with the first space-based component 110 over the first feeder link 116. A second gateway antenna 134, labeled as GA-S in FIG. 1, is configured to communicate with the second space-based component 120 over the second feeder link 126. It will be understood by those having skill in the art that the gateway antennas 132 and 134 may be substantially collocated or substantially spaced apart. Satellite gateway electronics 136 includes a common gateway infrastructure that is responsive to the first gateway antenna 132 and to the second gateway antenna 134. The satellite gateway electronics 136 may be linked and/or connected to other networks 140.

Figure 2:
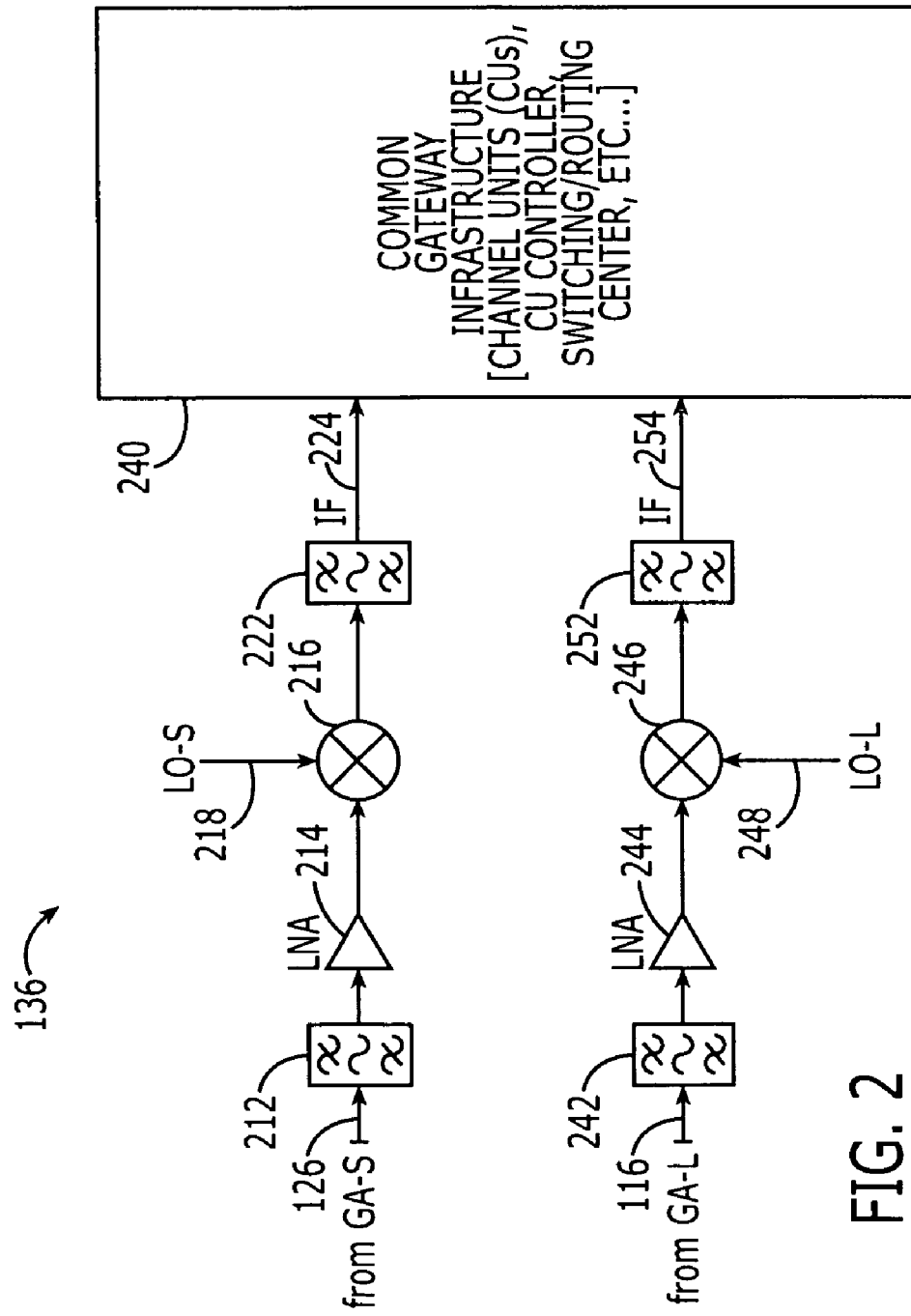
FIG. 2 is a block diagram of common gateway electronic systems and methods according to various embodiments of the present invention.

FIG. 2 is an illustrative block diagram of satellite gateway electronics, such as satellite gateway electronics 136 of FIG. 1, that may be provided according to various embodiments of the present invention. In accordance with some embodiments of FIG. 2, the two satellite systems (the L-band satellite and the S-band satellite) may use substantially the same air interface or different air interfaces. Moreover, in FIG. 2, only elements of the return feeder link electronics are shown. However, it will be understood by those having skill in the art that electronic elements analogous to those illustrated in FIG. 2 may be provided for the forward feeder links.

Referring now to FIG. 2, the second return feeder link signal 126, provided to the satellite gateway electronics 136 by the second gateway antenna 134, undergoes processing by a feeder link processing circuit so that the second return feeder link signal 126 is filtered by a filter 212, low noise amplified by a low noise amplifier (LNA) 214, translated to an intermediate frequency by a mixer 216 using a first local oscillator signal 218, and again filtered by a filter 222, to produce a signal at a first intermediate frequency (IF) 224. Similarly, the return feeder link signal 116 provided to the satellite gateway electronics 136 by the first gateway antenna 132 (via a respective feeder link processing circuit) is filtered by a filter 242, low noise amplified by a low noise amplifier 244, translated to an intermediate frequency by a mixer 246 using a second local oscillator signal 248 and filtered again by filter 252, to produce a signal at a second intermediate frequency 254. In some embodiments, the first and second intermediate frequencies 224 and 254, respectively, may be identical, nearly identical or different. In some embodiments, the first and second local oscillator signals 218 and 248, respectively, may be identical, nearly identical or different.

A common gateway infrastructure 240 can include channel units (i.e., transceivers comprising modulators, demodulators, amplifiers, mixers, filters, inter-leavers, de-inter-leavers Forward Error Correction (FEC) coders/decoders, vocoders, frame formatters, frame de-formatters and/or other signal processing functions and/or operations that may be associated with communications receiver/transmitter (i.e., transceiver) functions, not necessarily in the order specified), channel unit controllers, switching and/or routing elements, etc., and can operate in common on the two intermediate frequency signals 224 and 254 to process, demodulate, regenerate and/or route information. It will be understood by those having skill in the art that whereas in some embodiments (as illustrated in FIG. 2 and described above) the return feeder link signals 126 and 116 may be configured over intermediate frequencies prior to being presented to the common gateway infrastructure 240, in other embodiments, the return feeder link signals 126 and 116 may be configured at frequencies other than intermediate (i.e., RF or baseband) prior to being presented to the common gateway infrastructure 240.

Figure 3:
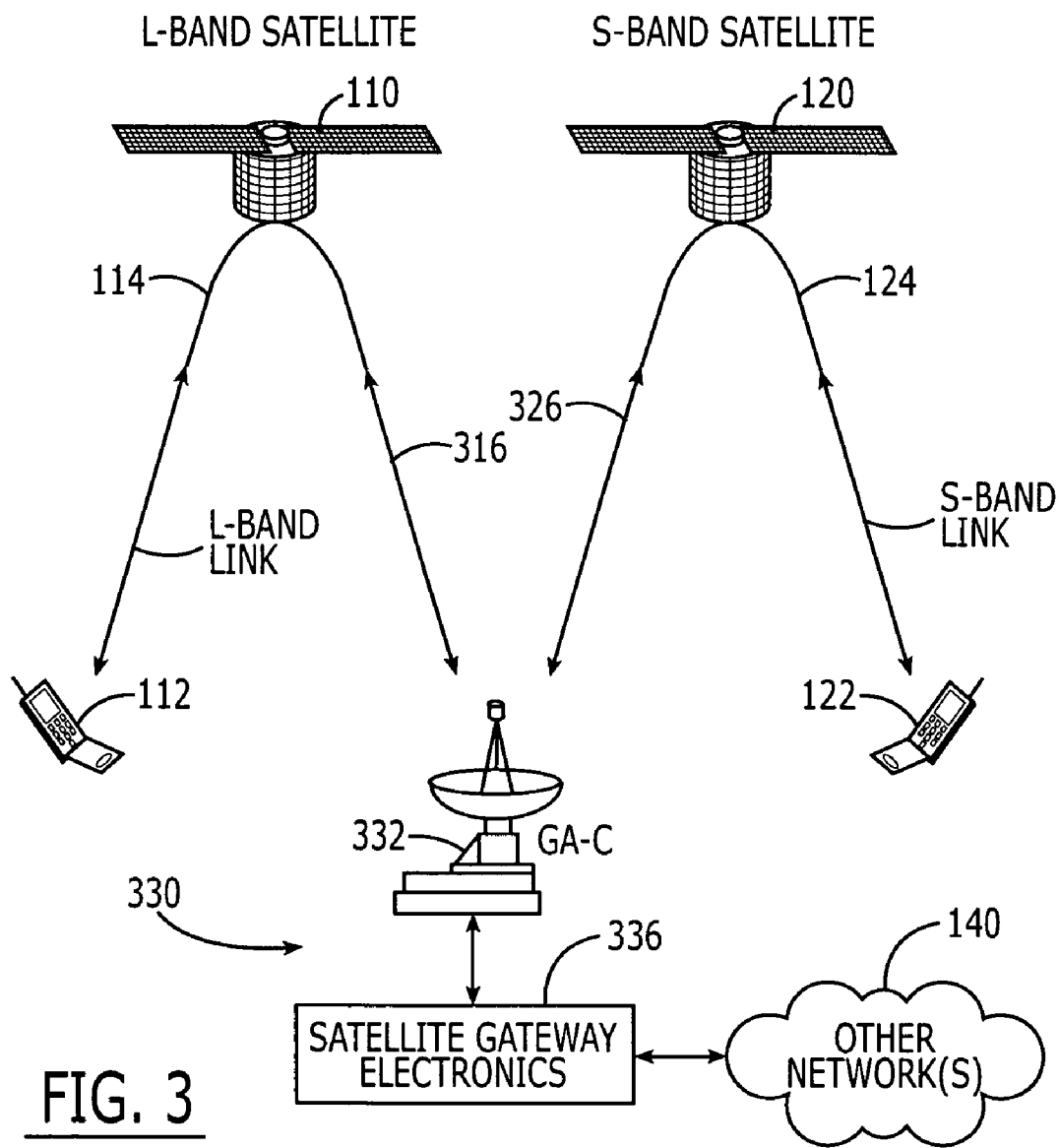
FIG. 3 schematically illustrates satellite systems and methods with shared ground infrastructure including a common gateway antenna according to other embodiments of the present invention.

FIG. 3 illustrates other embodiments of the present invention, wherein a common gateway antenna, as well as a common gateway infrastructure, is used. In particular, as shown in FIG. 3, the first and second space-based components 110 and 120 are configured to communicate with the respective pluralities of first and second wireless terminals 112 and 122 over the respective first and second service links 114 and 124, using substantially the same air interface in some embodiments. In other embodiments, different air interfaces may be used over the respective first and second service links 114 and 124. Moreover, in some embodiments, the first feeder link 316 and the second feeder link 326 may be in a common frequency band. The common frequency band may be any satellite or non-satellite frequency band, such as ku, ka, C, etc. In other embodiments, the first feeder link 316 and the second feeder link 326 may be in different frequency bands (i.e., ku-band and ka-band or ku-band and C-band). Moreover, the first and second space-based components 110 and 120 may be substantially collocated, for example, at 101° W, 54° W, 107.3° W, etc. If a common frequency band is used for the first and second feeder links 316 and 326, and the first and second satellites 110 and 120 are substantially collocated, then a common gateway antenna 332, also labeled GA-C in FIG. 3, may be provided that is configured to communicate with the first space-based component 110 and the second space-based component 120 over the first and second feeder links 316 and 326 in a common frequency band using substantially distinct portions thereof and/or substantially distinct spatial polarizations. Moreover, the satellite gateway electronics 336 may use a common gateway infrastructure (i.e., channel units, channel unit controller(s), switching circuit(s), etc.) without the need for the two separate signal paths shown in FIG. 2, and may be provided as shown, for example, in FIG. 4. In other embodiments, the two separate signal paths shown in FIG. 2 may be used. Furthermore, it will be understood that although the two satellites (i.e., space-based components) illustrated in FIGS. 1 and 3 are illustrated using different service link bands (i.e., L-band and S-band), the two satellites may be configured, in accordance with some embodiments of the invention, to communicate with radioterminals using service link frequencies of a common frequency band (i.e., frequencies of an L-band or an S-band, for example). Accordingly, a common gateway 330 can be shared, entirely or partially, by two (or more) space segments (i.e., space-based components) according to various embodiments of the present invention. It will be understood that in FIG. 1 and/or in FIG. 3, the feeder links 116 and 126 and/or 316 and 326 may use frequencies of a C-band, Ku-band, Ka-band, or any other band. It will also be understood that the feeder links 116 and 126 and/or 316 and 326 may use frequencies of a common band and that the frequencies of the common band may substantially overlap and exist over a substantially common polarization and/or over at least two different polarizations. Those skilled in the art will recognize that, in some embodiments, at least some of the feeder links illustrated in FIG. 1 and/or FIG. 3, may be associated with global feeder link beams (antenna patterns) formed by the satellites 110 and/or 120 and that in other embodiments, at least some of the feeder links illustrated in FIG. 1 and/or FIG. 3, may be associated with narrower (spot) feeder link beams (antenna patterns) that are formed by the satellites 110 and/or 120. Those skilled in the art will also recognize that in some embodiments, satellites 110 and 120 may be configured to communicate with radioterminals 112 and 122, respectively, using substantially the same service link and/or feeder link air interface and that, in other embodiments, different service link and/or feeder link air interfaces may be used. In some embodiments, at least one of the satellites (space-based components) 110 or 120 may be configured to communicate with at least two classes of radioterminals using at least two respectively different air interfaces.

In the drawings and specification, there have been disclosed embodiments of the invention and, although specific terms are employed, they are used in a generic and descriptive sense only and not for purposes of limitation. The following claims are provided to ensure that the present application meets all statutory requirements as a priority application in all jurisdictions and shall not be construed as setting forth the scope of the present invention.

What is claimed:

1. A satellite communications system comprising:
    a gateway configured to process first and second communications signals associated with respective first and second service links and respective first and second feeder links of respective first and second space-based components;
    wherein the first and second service links are in different respective first and second satellite frequency bands, wherein each one of the first and second service links comprises a forward service link and a return service link both of which are in the first or second satellite frequency band, and wherein the first and second feeder links are in different satellite frequency bands.

2. The satellite communications system according to claim 1 further comprising:
    respective first and second gateway antennas coupled to the gateway, wherein each of the respective first and second gateway antennas is configured to communicate with at least one of the respective first and second space-based components.

3. The satellite communications system according to claim 2 wherein the respective first and second gateway antennas are configured to communicate with the respective first and second space-based components via the respective first and second feeder links in respective first and second frequency bands.

4. The satellite communications system according to claim 2 wherein the gateway further comprises two circuits, each of which comprises:
    a first filter coupled to a gateway antenna;
    a low-noise amplifier coupled to an output of the first filter;
    a mixer coupled to an output of the low-noise amplifier; and
    a second filter coupled to an output of the mixer.

5. The satellite communications system according to claim 4 further comprising:
    a gateway element responsive to an output of at least one second filter.

6. The satellite communications system according to claim 1 wherein the respective first and second service links are configured to provide service to wireless terminals via respective air-interfaces that are substantially the same.

7. The satellite communications system according to claim 1 further comprising:
    a single gateway antenna coupled to the gateway, wherein the single gateway antenna is configured to communicate with the respective first and second space-based components.

8. The satellite communications system according to claim 7 wherein the single gateway antenna is configured to communicate with the respective first and second space-based components over separate feeder links which are respectively in different first and second satellite frequency bands.

9. The satellite communications system according to claim 7 wherein the respective first and second space-based components are substantially co-located.

10. The satellite communications system according to claim 1 wherein the respective first and second service links are configured to provide service to wireless terminals via respective different first and second air-interfaces.

11. The satellite communications system according to claim 1 wherein at least one element of the gateway is shared by the respective first and second space-based components to provide a processing of the first and second communications signals.

12. The satellite communications system according to claim 1 wherein the first service link comprises L-band frequencies and the second service link comprises S-band frequencies.

13. The satellite communications system according to claim 12 wherein both forward and return links included in the first service link comprise L-band frequencies and both forward and return links included in the second service link comprise S-band frequencies.

14. The satellite communications system according to claim 13 wherein the first feeder link comprises ku-band frequencies and wherein the second feeder link comprises C-band frequencies.

15. A satellite communications system comprising:
    a first space-based component that is configured to communicate with a plurality of first wireless terminals over first bi-directional service links which use exclusively frequencies of a first satellite frequency band in both directions;
    a second space-based component that is configured to communicate with a plurality of second wireless terminals over second bi-directional service links which use exclusively frequencies of a second satellite frequency band in both directions, the second satellite frequency band being different from the first satellite frequency band; and
    a satellite gateway that is configured to communicate with the first space-based component over a first feeder link and to communicate with the second space-based component over a second feeder link using at least one common signal processing element that is used by the satellite gateway to communicate with the first space-based component and to communicate with the second space-based component, wherein the first and second feeder links are in different satellite frequency bands.

16. The satellite communications system according to claim 15 wherein the satellite gateway comprises:
   a first gateway antenna that is configured to communicate with the first space-based component over the first feeder link;
   a second gateway antenna that is configured to communicate with the second space-based component over the second feeder link; and
   a common gateway electronics system that is responsive to the first gateway antenna and to the second gateway antenna.

17. The satellite communications system according to claim 16 wherein the first service links and the second service links use substantially the same air interface.

18. The satellite communications system according to claim 16 wherein the first service links and the second service links use different air interfaces.

19. The satellite communications system according to claim 16 wherein the first and second space-based components are substantially co-located.

20. The satellite communications system according to claim 19 wherein the satellite gateway comprises:
   a common gateway antenna that is configured to communicate with the first space-based component and the second space-based component over the first and second feeder links; and
   a common gateway electronics system that is responsive to the common gateway antenna.

21. The satellite communications system according to claim 15 wherein the first and second space-based components are configured to communicate with the respective pluralities of first and second wireless terminals over the respective first and second service links in the respective first and second satellite frequency bands using substantially the same air interface.

22. The satellite communications system according to claim 15 wherein the first service link comprises L-band frequencies and the second service link comprises S-band frequencies.

23. The satellite communications system according to claim 22 wherein both forward and return links included in the first service link comprise L-band frequencies and both forward and return links included in the second service link comprise S-band frequencies.

24. The satellite communications system according to claim 23 wherein the first feeder link comprises ku-band frequencies and wherein the second feeder link comprises C-band frequencies.

25. A method of providing satellite communications; the method comprising:
   processing at a satellite gateway first and second communications signals associated with respective first and second service links and respective first and second feeder links of respective first and second space-based components;
   wherein the first and second service links are in different respective first and second satellite frequency bands, wherein each one of the first and second service links comprises a forward service link and a return service link both of which are in the first or second satellite frequency band, and wherein the first and second feeder links are in different satellite frequency bands.

26. The method according to claim 25 wherein the satellite communications are provided by the respective first and second space-based components via respective different first and second air-interfaces.

27. The method according to claim 25 wherein processing comprises relaying information to/from a first space-based component and to/from a second space-based component via the satellite gateway.

28. The method according to claim 27 wherein relaying information comprises relaying internet communications, video information, and/or audio information, via the satellite gateway.

29. The method according to claim 25 wherein the first service link comprises L-band frequencies and the second service link comprises S-band frequencies.

30. The method according to claim 29 wherein both forward and return links included in the first service link comprise L-band frequencies and both forward and return links included in the second service link comprise S-band frequencies.

31. The method according to claim 30 wherein the first feeder link comprises ku-band frequencies and wherein the second feeder link comprises C-band frequencies.

* * * * *